(12) United States Patent
Boyd et al.

(10) Patent No.: US 8,731,235 B2
(45) Date of Patent: May 20, 2014

(54) FINGERPRINTING A DATA OBJECT (75) Inventors: Joseph Boyd, Sammamish, WA (US); Peter Marcotte, Kent, WA (US)

(73) Assignee: Irdeto B.V., Hoofddorp (NL)

( * ) Notice: Subject to any disclaimer, the term of this patent is extended or adjusted under 35 U.S.C. 154(b) by 166 days.

(21) Appl. No.: 12/648,725

(22) Filed: Dec. 29, 2009

(65) Prior Publication Data
US 2010/0303282 A1 Dec. 2, 2010

(30) Foreign Application Priority Data
Dec. 30, 2008 (EP) ...................................... 08173051

(51) Int. Cl.
*G06K 9/00* (2006.01)
(52) U.S. Cl.
USPC .......................................... 382/100; 713/176
(58) Field of Classification Search
USPC ............................... 382/100; 713/176; 356/71
See application file for complete search history.

(56) References Cited

U.S. PATENT DOCUMENTS

| | | | |
|---|---|---|---|
| 6,898,706 B1 * | 5/2005 | Venkatesan et al. ........... | 713/167 |
| 2003/0009669 A1 * | 1/2003 | White et al. ................... | 713/176 |
| 2003/0112974 A1 * | 6/2003 | Levy ............................. | 380/210 |
| 2003/0128860 A1 * | 7/2003 | Braudaway et al. ........... | 382/100 |
| 2005/0039022 A1 * | 2/2005 | Venkatesan et al. ........... | 713/176 |

FOREIGN PATENT DOCUMENTS

| | | | | |
|---|---|---|---|---|
| CN | 1419760 | | 5/2003 | ................ G06T 1/00 |
| WO | WO-01/67667 A1 | | 9/2001 | |
| WO | WO01/67667 | | 9/2001 | ................ H04L 9/00 |

OTHER PUBLICATIONS

Ogawa et al., "Trade-Off Traiter Tracing," Progress in Cryptology & Indocrypt, Dec. 9, 2007, pp. 331-340.*
"European Application Serial No. 08173051.7-2223, European Search Report", (Jul. 24, 2009), 10 pgs.
Hua, Xian-Sheng, et al., "Public Multiple Watermarking Resistant to Cropping", *Proc. of the 6th International Conference on Pattern Recognition and Information Processing*, (May 18, 2001), 263-267.
Lu, Chun-Shien, et al., "Near-Optimal Watermark Estimation and Its Countermeasure: Antidisclosure Watermark for Multiple Watermark Embedding", *IEEE Transactions on Circuits and Systems for Video Technology*, vol. 16, No. 4, (Apr. 1, 2007), 454-467.
Ogawa, Kazuto, et al., "Trade-Off Traitor Tracing", *Progress in Cryptology & Indocrypt 2007*, vol. 4859, (Dec. 9, 2007), 331-340.
Steinebach, Martin, et al., "Evaluation of robustness and transparency of multiple audio watermark embedding", *Proceedings of the SPIE the International Society for Optical Engineering*, vol. 6819, (Feb. 14, 2008), 1-8.
Steinebach, Martin, et al., "The Digital Watermarking Container: Secure and Efficient Embedding", *Proceedings of the Multimedia and Security Workshop 2004*, (Sep. 20, 2004), 199-205.

(Continued)

*Primary Examiner* — John Strege
(74) *Attorney, Agent, or Firm* — Marc S. Kaufman; Reed Smith LLP (57) ABSTRACT

Embodiments of the invention provide a method and a system for fingerprinting a data object at a server system and a method and a system for extracting the fingerprint from the data object at a client system. Sections of a data object are watermarked with known watermark data to create a first and a second variant of the data object, whereby the section boundaries are optionally saved as metadata. Using the metadata, the first and second variant are combined by taking sections from the variants to create a fingerprinted data object. From the fingerprinted data object, the watermark data can be extracted again.

20 Claims, 4 Drawing Sheets

(56) References Cited

OTHER PUBLICATIONS

"European Application No. 08173051.7, Summons to Attend Oral Proceedings mailed Mar. 7, 2012", 4 pgs.

Depovere, Geert, et al., "The VIVA Project: Digital Watermarking for Broadcast Monitoring", vol. 2, Image Processing, 1999, ICIP 99, Proceedings, 1999 International Conference ON—Kobe, Japan, IEEE, Piscataway, NJ (XP010369106), (Oct. 24, 1999), 202-205.

Kopilovic, Ivan, et al., "Video-DNA: Large-Scale Server-Side Watermarking", 15th European Signal Processing Conference (EUSIPCO 2007), Poznan, Poland, Sep. 3-7, 2007 (XP007912528), (Sep. 3, 2007), 2286-2290.

Chinese Office Action (no translation) issued in corresponding application No. 200911000132.X, dated Sep. 3, 2013 (8 pgs).

* cited by examiner

FINGERPRINTING A DATA OBJECT

CLAIM OF PRIORITY

The present patent application claims the priority benefit under 35 U.S.C. §119 to the filing date of European Application (EPO) No. 08173051.7, filed Dec. 30, 2008, the entire content of which is incorporated herein by reference in its entirety.

FIELD OF THE INVENTION

The present invention relates to a computer-implemented method for fingerprinting a data object, a server system for fingerprinting a data object, a computer-implemented method for extracting a fingerprint value from a data object and a client system for extracting a fingerprint value from a fingerprinted data object.

BACKGROUND

Digital watermarking is the process of embedding digital information into a data object to allow identification of the data object. The digital object is e.g. a data file, video file, audio file, a directory of files or streaming data. If the data object is copied, then the watermark is also carried in the copy. In visible watermarking, the information is visible in the picture or video. Typically, the information is text or a logo which identifies the owner of the media. In invisible watermarking, information is added as watermark data to the data object, but it cannot be perceived as such. Invisible watermarking is typically used in copyright protection systems, which are intended to prevent or deter unauthorized copying of data objects.

When a sequence of watermarks is added to a data object, this sequence of watermarks is called a fingerprint. An example of such fingerprint is described in U.S. Pat. No. 7,058,809 and European patent application 08100123.2. A fingerprint that is composed of a sequence of watermarks must be readily detectable in order to be useful. Extracting the watermark data forming the fingerprint from a data object is problematic if there are few clues as to where to find the individual watermark data or where the fingerprint starts or ends. Moreover, the watermark data in a sequence of identically-valued watermark data can be hard to count, and watermarking technologies that embed watermarks at variable locations—possibly with variable density—and with an unclear indication as to the precise location of the watermark data make the task even more difficult.

There is a need for an improved method and system for fingerprinting a data object and extracting a fingerprint from a data object to allow creation and verification of a fingerprinted data object.

SUMMARY OF THE INVENTION

It is an object of the invention to provide an improved method and system for fingerprinting a data object and extracting a fingerprint from a data object.

According to an aspect of the invention a computer-implemented method is proposed for fingerprinting a data object to provide a fingerprinted data object. The data object is typically a video file, but can be any other type of data. The method comprises the step of detecting one or more boundary locations in the data object. The boundary locations define the exact byte location where the data object can be split without introducing a distortion to the data object. In case of a video file the boundary locations typically align with points in the file where splicing can occur without introducing artefacts when playing the video file. The method further comprises the step of splitting the data object at the boundary locations to obtain two or more sections. The method further comprises the steps of embedding first watermark data in the sections to obtain first watermarked sections and embedding second watermark data in the sections to obtain second watermarked sections. Any known watermarking technique may be used to embed a watermark in a section. The method further comprises the steps of combining the first watermarked sections to obtain a first variant of the data object and combining the second watermarked sections to obtain a second variant of the data object. The method further comprises the step of obtaining a fingerprint value comprising a sequence of watermark identifiers. The watermark identifiers have a value and a position. The value indicates the first or second variant. The position indicates the watermarked section within the first or second variant. The method further comprises the step of combining the first and second watermarked sections of the first and second variant, respectively, in accordance with the fingerprint value to provide the fingerprinted data object. The watermark data is unique for each section and variant.

According to an aspect of the invention a server system is proposed for fingerprinting a data object to provide a fingerprinted data object. The data object is typically a video file, but can be any other type of data. The server system comprises a variant generator, a watermark embedder and a section selector. The variant generator is configured to detect one or more boundary locations in the data object using a detector. The boundary locations define the exact byte location where the data object can be split without introducing a distortion to the data object. In case of a video file the boundary locations typically align with points in the file where splicing can occur without introducing artefacts when playing the video file. The variant generator is further configured to split the data object at the boundary locations to obtain two or more sections using a splitter. The variant generator is further configured to send the sections to the watermark embedder and receive first watermarked sections and second watermarked sections from the watermark embedder. The watermark embedder is configured to embed first watermark data in the sections to obtain the first watermarked sections and embed second watermark data in the sections to obtain the second watermarked data. Any known watermarking technique may be used to embed a watermark in a section. The variant generator is further configured to combine the first watermarked sections to obtain a first variant of the data object and combine the second watermarked sections to obtain a second variant of the data object using a combiner. The section selector is configured to obtain a fingerprint value. The fingerprint value comprises a sequence of watermark identifiers. The watermark identifiers have a value and a position. The value indicates the first or second variant and the position indicates the watermarked section within the first or second variant. The section selector is further configured to combine using the combiner the first and second watermarked sections of the first and second variant, respectively, in accordance with the fingerprint value to provide the fingerprinted data object. It is possible that the combiner used by the section selector is different from the combiner used by the variant generator. The watermark provider is configured to provide unique watermark data for each section and variant.

It is possible to make copies of the data object and split the first copy (or original) to obtain the sections to be watermarked with the first watermark data and split the second copy to obtain the sections to be watermarked with the second watermark data. Alternatively the sections obtained after splitting the data object are copied and the first copy (or original) of the section is watermarked with the first watermark data and the second copy of the section is watermarked with the second watermark data. In a further alternative each section obtained after splitting the data object is used twice, i.e. firstly to create the first watermarked sections and secondly to create the second watermarked sections.

Thus a fingerprinted data object can be created wherein, by virtue of embedding known watermark data in each section of each variant, the watermark data embedded in the fingerprinted data object—including the start and the end of the fingerprint—can be identified. Moreover, by virtue of using the boundary locations, it is achieved that the data object can be easily fingerprinted without introducing artefacts or other human detectable distortions to the data object.

The embodiments of claims 2 and 7 advantageously store the boundary location in the metadata. The metadata can thus be used to determine where the watermarked sections from the variants are to be combined or multiplexed.

The embodiments of claims 3 and 8 advantageously enable the fingerprinted data object to be cryptographically protected.

The embodiments of claims 4 and 9 advantageously enable addition of data, preferably advertisement data, within the section boundaries.

The embodiments of claims 5 and 9 advantageously enable addition of data, preferably advertisement data, outside the section boundaries.

According to an aspect of the invention a computer-implemented method is proposed for extracting a fingerprint value from a fingerprinted data object. The method is typically performed in a client system that receives the fingerprinted data object from a server system that created the fingerprinted data object using the method described above. The method comprises the step of extracting a sequence of watermark data from the fingerprinted data object. The method further comprises the step of obtaining watermark data for all sections and variants used when creating the fingerprinted data object. The method further comprises the steps of locating and identifying the obtained watermark data in the sequence of watermark data to obtain the fingerprint value.

According to an aspect of the invention a client system is proposed for extracting a fingerprint value from a fingerprinted data object. The client system typically receives the fingerprinted data object from a server system as described above. The client system comprises a watermark detector connected to a fingerprint detector. The watermark detector is configured to extract a sequence of watermark data from the fingerprinted data object. The fingerprint detector is configured to obtain watermark data for all sections and variants as used when creating the fingerprinted data object. The fingerprint detector is further configured to locate and identify the obtained watermark data in the sequence of watermark data to obtain the fingerprint value.

Thus the fingerprint value can be easily obtained from the fingerprinted data object. The obtained fingerprint value can e.g. be compared with the original fingerprint value used to create the fingerprinted data object. A difference between the obtained fingerprint value and the original fingerprint value indicates a corruption or modification of the fingerprinted data object. From the difference, by virtue of all watermark data of all segments and variants being known, it can e.g. be derived which segments have been corrupted of modified.

The embodiment of claim 12 advantageously enables extraction of a fingerprint value from cryptographically protected fingerprinted data objects.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to exemplary embodiments shown in the drawings, in which.

DETAILED DESCRIPTION OF THE INVENTION

Variants are alternate forms of a data object such as a file or directory of files. Variants differ in that the files contain different watermarks, are encrypted with different keys, and/or possibly contain different advertisement data such as an advertising video at some points in the file, but they are otherwise identical. File variants have the same name and length, and directory variants have the same directory names, filenames and file lengths. Variants are typically identified by a positive integer, beginning with 0 and incrementing by 1 up to a maximum of e.g. 255, i.e., variant 0, variant 1, ..., variant 255.

Figure 1:
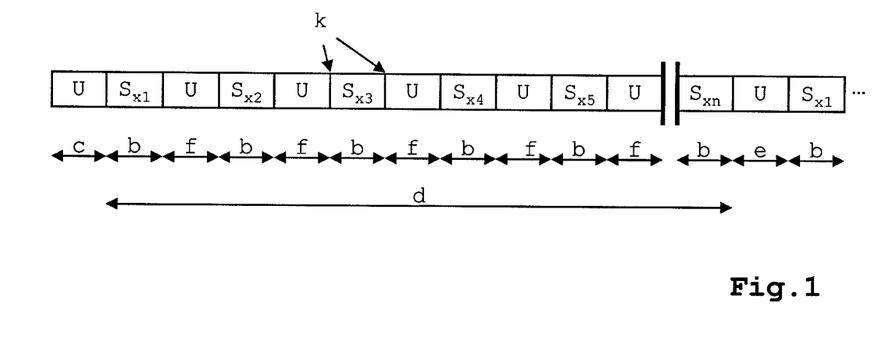
FIG. 1 shows a format of a variant of a data object of an exemplary embodiment of the invention.

In FIG. 1 the format of a variant of a data object of an exemplary embodiment of the invention is shown. Herein the following notation is used:

k=Multiplex boundary locations;
U=Un-watermarked sections, or watermarked with a "don't care" value;
$S_{xy}$=Section watermarked with preferably unique watermark data in variant x at sequence number y;
c=Size of pre-fingerprint section U, size=M units, M>=0;
b=Size of watermarked section, size=N units, N>0;
f=Size of inter-watermark section, size=L units, L>=0;
e=Size of inter-fingerprint section, size=Q units, Q>=0;
d=Size of fingerprinted data object, size=PN+(P−1)L units (if all b are equal length and all f are equal length), wherein P=Number of watermarked sections.

The pre-fingerprint, inter-watermark and inter-fingerprint sections, if used, are areas where no watermarks or fingerprint information exists. Such areas are useful places to locate e.g. advertisements because if the advertisements are removed it has no effect on the fingerprint. If the pre-fingerprint section is used, then this section comprises a third data object, preferably advertisement data. If an inter-watermark section is used, then this section comprises a fourth data object, preferably advertisement data. If the inter-fingerprint section is used, then this section comprises a fifth data object, preferably advertisement data.

The multiplex boundary locations k are the locations where variants will be combined or multiplexed together. They align with points in the file where splicing can occur without introducing artefacts. For MPEG formats, this corresponds to open GOP (Group Of Pictures) boundaries. In general, they also align with encryption key-change boundaries if the data object is encrypted. The unit of measure for c, b, f, e and d between the multiplex boundaries k can vary from system to system. The unit of measure between multiplex boundaries is e.g. GOPs, frames, encryption key-changes, or other units as appropriate for the file type and system.

Figure 2:
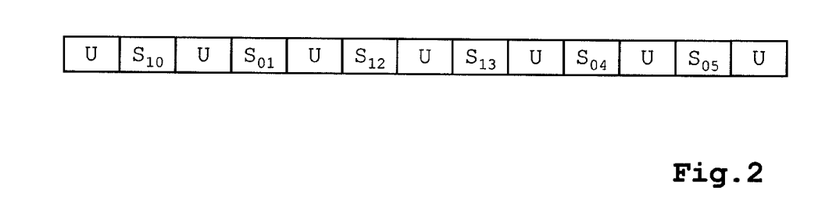
FIG. 2 shows a fingerprinted data object of an exemplary embodiment of the invention.

From multiple variants of the data object the fingerprinted data object is created. The fingerprinted data object consists of watermarked sections $S_{xy}$ from multiple variants, possibly including the inter-watermark sections U. The fingerprinted data object is optionally preceded by the pre-fingerprint section U or followed by the inter-fingerprint section U. The fingerprint data object is formed by the combination of sections selected from two or more variants. The final fingerprint is a base-n integer, where n is the number of variants. An example of a 4-digit, base-2 fingerprinted data object formed by the combination of two variants, 0 and 1, is shown in FIG. 2. In FIG. 2 the fingerprint value equals 101100, resulting in the fingerprinted data object to be created from the first watermarked section from variant 1 (i.e. $S_{10}$), the second watermarked section from variant 0 (i.e. $S_{01}$), the third watermarked section from variant 1 (i.e. $S_{12}$), the fourth watermarked section from variant 1 (i.e. $S_{13}$), the fifth watermarked section from variant 0 (i.e. $S_{04}$) and the sixth watermarked section from variant 0 (i.e. $S_{05}$).

The watermark data used to watermark the sections $S_{xy}$ is preferably different for each section $S_{xy}$ and different for each variant. Thus, the watermarks of the fingerprint are delimited because successive digits always have different watermark values, even after variants are combined and successive digits come from the same variant. The pre-fingerprint, inter-watermark and inter-fingerprint sections are un-watermarked or are watermarked with a "don't care" watermark value, and thus don't contribute to the fingerprint.

Watermark data is added to the sections $S_{xy}$ using any known watermarking technique. The watermark data is e.g. an integer value that is invisibly added to the section $S_{xy}$. For example, for the 2-variant system above with six watermarked sections per variant the watermark data can be randomly but uniquely generated as: watermark data for S00=3948372, watermark data for S01=438828, watermark data for S02=121, watermark data for S03=992370, watermark data for S04=4236, watermark data for S05=8, watermark data for S10=5372, watermark data for S11=43, watermark data for S12=3713, and watermark data for S13=68838, watermark data for S=9257, watermark data for S15=62275. Alternatively the watermark data is predefined or otherwise obtained instead of randomly generated.

The width b of each watermarked section is typically about equal, however it is possible to vary the width b. A watermarked section may be made longer, for example, in order to accommodate additional advertisement video within that section. In the latter case, the section width is generally the typical section width plus the width of the advertisement. The advertisement data itself is typically not watermarked, but may be watermarked, and has no effect on the fingerprint value or the overall fingerprint of the fingerprinted data object.

Figure 3:
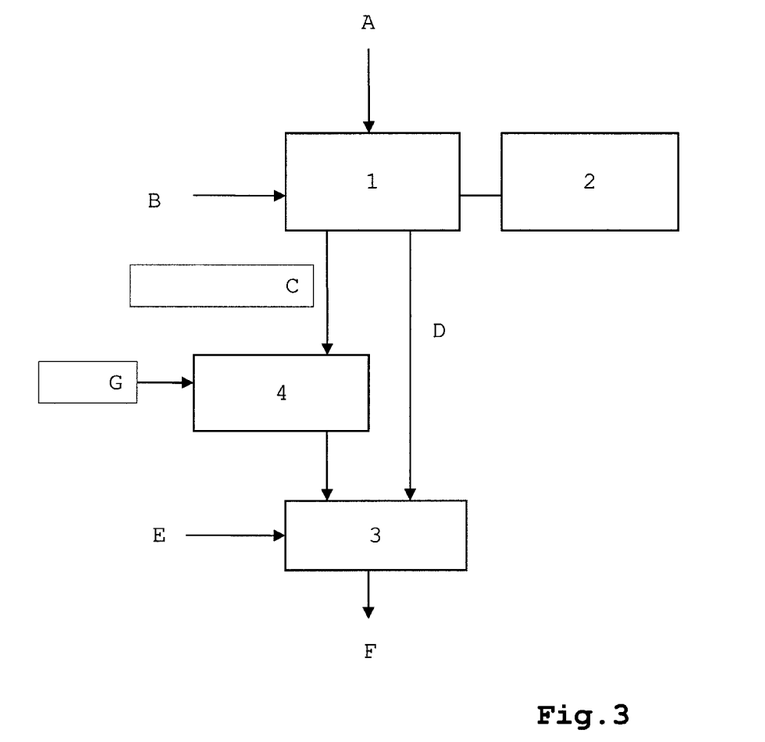
FIG. 3 shows a simplified server system for fingerprinting a data object of an exemplary embodiment of the invention.

A simplified server system for fingerprinting a data object A is shown in FIG. 3. Known elements of the server system like a processor, a memory, data busses and input/output interfaces are not shown. The components are typically implemented as software but could be implemented in hardware as well. A variant generator 1 uses a watermark embedder 2 and input data B comprising the watermark data for each section in each variant and the number of variants to obtain the variants C and metadata D. A detector, a splitter and a combiner, which are part of the variant generator 1 or implemented as separate modules, are used to respectively detect the boundary locations k and split the data object A. The metadata includes the multiplex boundary locations k and possibly the values for M, N, L, and Q. Optionally an encryptor 4 encrypts one or more sections or a complete variant using appropriate encryption keys G. Section selector 3, abiding by the multiplex boundary locations k in the metadata, uses the supplied fingerprint value E to choose a sequence of sections $S_{xy}$ from the variants, and combines them to form a complete fingerprinted data object F. A combiner, which is part of the section selector 3 or implemented as a separate module, is used for combining the sections $S_{xy}$ from the variants. It is possible that the section selector 3 uses the combiner of the variant generator 1 for this task.

Figure 4:
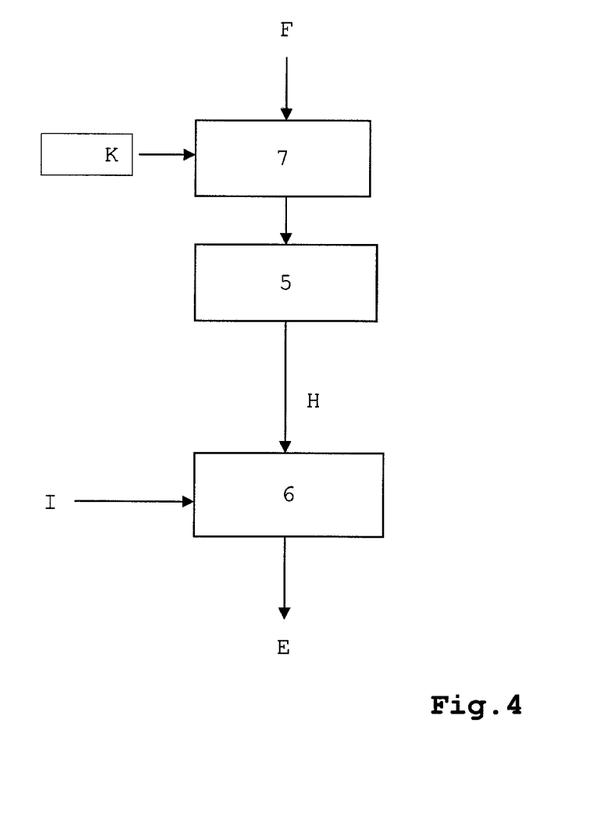
FIG. 4 shows a simplified client system for extracting a fingerprint value from a data object of an exemplary embodiment of the invention.

A simplified client system for extracting a fingerprint value from a fingerprinted data object F is shown in FIG. 4. Known elements of the server system like a processor, a memory, data busses and input/output interfaces are not shown. If the fingerprinted data object F contains encrypted portions, a decryptor 7 first decrypts the fingerprinted data object F using decryption keys K. A watermark detector 5 then extracts a sequence of watermark data H from the data object. Fingerprint detector 6 obtains watermark data I for all sections and variants used when creating the fingerprinted data object F. This watermark data I is e.g. stored in a memory (not shown) or received from the server system of FIG. 3. The fingerprint detector 6 uses the watermark data I to locate and identify each watermark data in the sequence of watermarks H. The result should be the original fingerprint value E, unless the data object has been altered or damaged. In the latter case an altered fingerprint value is obtained. When comparing the altered fingerprint value with the original fingerprint value E it can be derived which watermarked sections $S_{xy}$ are replaced or missing. Following the example presented above, the fingerprint detector should establish that the sequence of watermark data H of 5372, 438828, 3713, 68838, 4236, 8 corresponds to the fingerprint value E of 101100.

Figure 5:
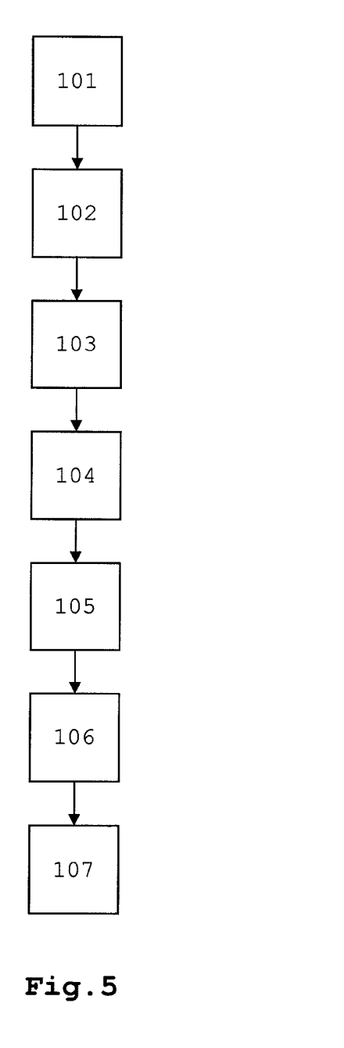
FIG. 5 shows the steps of a method for fingerprinting a data object of an exemplary embodiment of the invention.

In FIG. 5 the steps of a method for fingerprinting a data object A are shown. In step 101 the multiplex boundary locations k are detected in the data object A. In step 102 the data object A is split at the detected boundary locations k to define the sections of the data object to be watermarked. In step 103 the watermark data is embedded in the sections to obtain watermarked sections $S_{xy}$. The watermarked sections $S_{xy}$ are combined in step 104 to obtain a variant of the data object.

It is possible to make copies of the data object and split the first copy (or original) to obtain the sections to be watermarked with the first watermark data and split the second copy to obtain the sections to be watermarked with the second watermark data. Alternatively the sections obtained after splitting the data object are copied and the first copy (or original) of the section is watermarked with the first watermark data and the second copy of the section is watermarked with the second watermark data. In a further alternative each section obtained after splitting the data object is used twice, i.e. firstly to create the first watermarked sections and secondly to create the second watermarked sections.

Steps 103 and 104 are repeated until all variants C, the number of variants being defined by input data B, is obtained. In step 105 metadata D is generated comprising the boundary locations k. In step 106 a fingerprint value E is obtained comprising a sequence of watermark identifiers, wherein each watermark identifier identifies which variant to use when combining two or more variants and wherein the sequence of the watermark identifiers corresponds to a sequence of watermarked sections $S_{xy}$ from the two or more variants C representing a fingerprinted data object F. An example of such fingerprint value E is the value of 101100 as presented above. In step 107 the variants C are combined in accordance with the fingerprint value E to create the fingerprinted data object F. The metadata D is herewith used to determine where the watermarked sections $S_{xy}$ from the variants C are to be combined.

Figure 6:
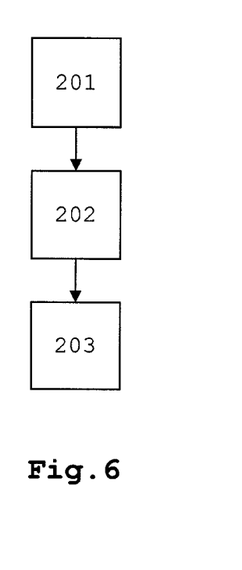
FIG. 6 shows the steps of a method for extracting a fingerprint value from a fingerprinted data object of an exemplary embodiment of the invention.

In FIG. 6 the steps of a method for extracting a fingerprint value E from a fingerprinted data object F is shown. In step 201 a sequence of watermark data H is extracted from the fingerprinted data object F. Watermark data I for all sections and variants used when creating the fingerprinted data object F is obtained in step 202. In step 203 the obtained watermark data I is located and identified in the sequence of watermark data H to obtain the fingerprint value E. Following the example presented above, the sequence of watermark data H of 5372, 438828, 3713, 68838, 4236, 8 will be identified as the fingerprint value E of 101100.

What is claimed is:

1. A computer-implemented method for fingerprinting a data object to provide a fingerprinted data object, comprising:
   detecting one or more boundary locations in the data object;
   splitting the data object at the boundary locations to obtain two or more sections;
   embedding first watermark data in the two or more sections to obtain two or more first watermarked sections;
   combining the two or more first watermarked sections to obtain a first variant of the data object;
   embedding second watermark data in the two or more sections to obtain two or more second watermarked sections;
   combining the two or more second watermarked sections to obtain a second variant of the data object;
   obtaining a fingerprint value comprising a sequence of watermark identifiers, the watermark identifiers having a value and a position, the value indicating the first or second variant and the position indicating the two or more first or second watermarked sections within the first or second variant, respectively; and
   combining the first and second watermarked sections of the first and second variant, respectively, in accordance with the fingerprint value to provide the fingerprinted data object,
   wherein the watermark data is unique for each section and variant.

2. The method according to claim 1, further comprising:
   generating metadata comprising the boundary locations, and wherein the metadata is used to determine where the first and second watermarked sections are to be combined.

3. The method according to claim 1, further comprising:
   encrypting one or more of the two or more first and two or more second watermarked sections.

4. The method according to claim 1, further comprising:
   adding a second data object, preferably advertisement data, to at least one or more of the first and second watermarked sections.

5. The method according to claim 2, wherein combining the watermarked sections comprises one or more of the following:
   adding a third data object, preferably advertisement data, before the first watermarked section of at least one of the first and second variant;
   adding a fourth data object, preferably advertisement data, in-between the watermarked sections of at least one of the first and second variant;
   adding a fifth data object, preferably advertisement data, after the last watermarked section of at least one of the first and second variant,
   and comprises:
   determining where at least one of the third data object, the fourth data object and the fifth data object are to be included in the fingerprinted data object using one or more of the following indications in the metadata: a length of the third data object; a length of the fourth data object; a length of the fifth data object.

6. A server system for fingerprinting a data object to provide a fingerprinted data object, comprising:
   a variant generator;
   a watermark embedder; and
   a section selector;
   wherein:
   the variant generator is configured to detect one or more boundary locations in the data object using a detector, split the data object at the boundary locations to obtain two or more sections using a splitter, send the two or more sections to the watermark embedder, receive two or more first watermarked sections and two or more second watermarked sections from the watermark embedder, combine the two or more first watermarked sections to obtain a first variant of the data object and combine the two or more second watermarked sections to obtain a second variant of the data object using a combiner;
   the watermark embedder is configured to embed first watermark data in the two or more sections to obtain the first watermarked sections and embed second watermark data in the two or more sections to obtain the second watermarked sections;
   the section selector is configured to obtain a fingerprint value comprising a sequence of watermark identifiers, the watermark identifiers having a value and a position, the value indicating the first or second variant and the position indicating the two or more watermarked sections within the first or second variant; and
   the section generator is configured to combine using the combiner the two or more first and second watermarked sections of the first and second variant, respectively, in accordance with the fingerprint value to provide the fingerprinted data object,
   wherein the watermark provider is configured to provide unique watermark data for each section and variant.

7. The server system according to claim 6, wherein the variant generator is further configured to generate metadata comprising the boundary locations, and wherein the section selector uses the metadata to determine where the first and second watermarked sections are to be combined.

8. The server system according to claim 6, further comprising:
   an encryptor configured to encrypt one or more of the first and second watermarked sections.

9. The server system according to claim 6, wherein the variant generator is further configured to add a second data object, preferably advertisement data, to one or more of the first and second watermarked sections.

10. The server system according to claim 7, wherein the variant generator is further configured to add at least one of:
    a third data object, preferably advertisement data, before the first watermarked section of the first and second variant;

a fourth data object, preferably advertisement data, in-between the watermarked sections of the first and second variant;

a fifth data object, preferably advertisement data, after the last watermarked section of the first and second variant, wherein the variant generator is configured for determining where at least one of the third data object, the fourth data object and the fifth data object are to be included in the fingerprinted data object using one or more of the following indications in the metadata: a length of the third data object; a length of the fourth data object; a length of the fifth data object.

11. A computer-implemented method for extracting a fingerprint value from a fingerprinted data object that is created using the method comprising:

detecting one or more boundary locations in the data object, splitting the data object at the boundary locations to obtain two or more sections, embedding first watermark data in the two or more sections to obtain two or more first watermarked sections, combining the two or more first watermarked sections to obtain a first variant of the data object, embedding second watermark data in the two or more sections to obtain two or more second watermarked sections, combining the two or more second watermarked sections to obtain a second variant of the data object, obtaining a fingerprint value comprising a sequence of watermark identifiers, the watermark identifiers having a value and a position, the value indicating the first or second variant and the position indicating the two or more first or second watermarked sections within the first or second variant, respectively and combining the first and second watermarked sections of the first and second variant, respectively, in accordance with the fingerprint value to provide the fingerprinted data object, wherein the watermark data is unique for each section and variant, said computer-implemented method comprising:

extracting a sequence of watermark data from the fingerprinted data object;

obtaining or having available watermark data for all sections and variants used when creating the fingerprinted data object;

locating and identifying the obtained watermark data in the sequence of watermark data to obtain the fingerprint value.

12. The method according to claim 11, further comprising:
decrypting the fingerprinted data object prior to extracting the sequence of watermark data.

13. The method according to claim 11, further comprising:
generating metadata comprising the boundary locations, and wherein the metadata is used to determine where the first and second watermarked sections are to be combined.

14. The method according to claim 11, further comprising:
encrypting one or more of the first and second watermarked sections.

15. The method according to claim 11, further comprising:
adding a second data object, preferably advertisement data, to at least one or more of the first and second watermarked sections.

16. The method according to claim 11, wherein combining the watermarked sections comprises one or more of the following:

adding a third data object, preferably advertisement data, before the first watermarked section of at least one of the first and second variant;

adding a fourth data object, preferably advertisement data, in-between the watermarked sections of at least one of the first and second variant;

adding a fifth data object, preferably advertisement data, after the last watermarked section of at least one of the first and second variant, and comprises:

determining where at least one of the third data object, the fourth data object and the fifth data object are to be included in the fingerprinted data object using one or more of the following indications in the metadata: a length of the third data object; a length of the fourth data object; a length of the fifth data object.

17. A client system for extracting a fingerprint value from a fingerprinted data object that is created using a system comprising:

a variant generator, a watermark embedder and a section selector, wherein the variant generator is configured to detect one or more boundary locations in the data object using a detector, split the data object at the boundary locations to obtain two or more sections using a splitter, send the two or more sections to the watermark embedder, receive two or more first watermarked sections and two or more second watermarked sections from the watermark embedder, combine the two or more first watermarked sections to obtain a first variant of the data object and combine the two or more second watermarked sections to obtain a second variant of the data object using a combiner, the watermark embedder is configured to embed first watermark data in the two or more sections to obtain the first watermarked sections and embed second watermark data in the two or more sections to obtain the second watermarked sections, the section selector is configured to obtain a fingerprint value comprising a sequence of watermark identifiers, the watermark identifiers having a value and a position, the value indicating the first or second variant and the position indicating the two or more watermarked sections within the first or second variant and the section generator is configured to combine using the combiner the two or more first and second watermarked sections of the first and second variant, respectively, in accordance with the fingerprint value to provide the fingerprinted data object, wherein the watermark provider is configured to provide unique watermark data for each section and variant, said client system comprising a watermark detector connected to a fingerprint detector, wherein:

the watermark detector is configured to extract a sequence of watermark data from the fingerprinted data object; and the fingerprint detector is configured to obtain or have available watermark data for all sections and variants used when creating the fingerprinted data object and locate and identify the obtained watermark data in the sequence of watermark data to obtain the fingerprint value.

18. The server system according to claim 17, wherein the variant generator is further configured to generate metadata comprising the boundary locations, and wherein the section selector uses the metadata to determine where the first and second watermarked sections are to be combined.

19. The server system according to claim 17, further comprising:

an encryptor configured to encrypt one or more of the first and second watermarked sections.

20. The server system according to claim 17, wherein the variant generator is further configured to add a second data object, preferably advertisement data, to one or more of the first and second watermarked sections.

* * * * *